United States Patent Office 3,538,227
Patented Nov. 3, 1970

3,538,227
TRICYCLIC PHENOXY-ACID AND ESTER HYPO-CHOLESTEROLEMIC COMPOSITIONS
William Laszlo Bencze, New Providence, N.J., assignor to Ciba Corporation, New York, N.Y., a corporation of Delaware
No Drawing. Filed Jan. 30, 1967, Ser. No. 612,345
Int. Cl. A61k 27/00
U.S. Cl. 424—317
2 Claims

ABSTRACT OF THE DISCLOSURE

Tricyclic phenoxy-acids of the formula I

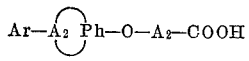

$A_1, A_2$ = alkylene or alkenylene
Ph = 1,2-phenylene
Ar = monocyclic aryl and their functional derivatives, particularly the 2-(1-phenyl-1,2,3,4-tetrahydro-6-naphthoxy) - isobutyric acid, are hypocholesterolemic agents.

SUMMARY

The present invention concerns and has for its object the provision of tricyclic phenoxy-acids of the Formula I, in which each of $A_1$ and $A_2$ stands for lower alkylene or alkenylene, the latter of which forming with Ph a 5- to 7-membered ring and carrying Ar at the carbon atom adjacent to Ph, Ph for a 1,2-phenylene radical connected with the acid moiety in any of the remaining positions and Ar for a monocyclic carbocyclic or mono-aza-, oxa- or thiacyclic aryl radical, of their functional derivatives, as well as of corresponding pharmaceutical compositions and methods for the preparation of the new compounds.

DESCRIPTION

A lower alkylene radical $A_1$ preferably is methylene or 2,2-propylene, but also, for example, 1,1- or 1,2-ethylene, 1,1-, 1,2-, or 1,3-propylene, 1,1-, 1,2-, 2,2-, 2,3- or 1,4-butylene, 1,1-, 1,2-, 3,3- or 2,4-pentylene, 3,3- or 3,4-hexylene or 4,4-heptylene. A lower alkenylene radical $A_1$ is, for example, ethenylene, 1,2-, 2,3- or 1,3-propenylene, 1,4-butenylene, 1,4- or 2,3-but-2-enylene, 2,3-pent-2-enylene, 1,3-hex-2-enylene or 1,1-hept-3-enylene. The alkylene or alkenylene $A_2$ preferably is 1,4-butylene or 1,4-butenylene, but also one of those groups listed for $A_1$, provided it forms with the ortho positions of Ph a 5- to 7-membered ring and can carry Ar at the carbon atom adjacent to Ph.

The 1,2-phenylene radical carrying the acid moiety is unsubstituted or substituted in the remaining 3 positions by one or more than one of the same or of different substituents, such as lower alkyl, e.g. methyl, ethyl, n- or i-propyl or -butyl, lower alkoxy, e.g. methoxy, ethoxy, n- or i-propoxy or -butoxy, halogeno, e.g. fluoro, chloro or bromo, trifluoromethyl or amino, preferably di-lower alkylamino, e.g. dimethylamino or diethylamino.

The aryl radical Ar is preferably phenyl or phenyl substituted as shown for Ph, but also, for example, 2-, 3- or 4-pyridyl, 2- or 3-furyl or -thienyl or such radical substituted by lower alkyl.

Functional derivatives of the acids of Formula I are preferably their esters, for example, their lower alkyl, e.g. methyl, ethyl, n- or i-propyl, n-, i-, sec. or tert. butyl esters, or substituted lower alkyl, particularly tert. amino-lower alkyl or lower alkoxy-lower alkyl esters, in which the amino or alkoxy group is separated from the carboxy oxygen by at least 2 carbon atoms, preferably by 2 or 3 carbon atoms. A tertiary amino group is above all di-lower alkylamino, e.g. dimethylamino or diethylamino, lower alkenyleneimino, e.g. pyrrolidino or piperidino, or mono-aza- or oxa-lower alkyleneimino, such as piperazino, 4-lower alkyl-piperazino, e.g. 4-methyl- or ethyl-piperazino, or morpholino. Other functional derivatives of the acids of Formula I are, for example, unsubstituted or substituted amides, e.g. mono- or di-lower alkylamides, lower alkyleneamides or the nitrile.

The compounds of this invention possess valuable pharmacological properties. For example, they cause a reduction of the cholesterol level in the blood, as can be demonstrated in animal tests using, for example mammals, e.g. rats, as test objects. They are, therefore, useful as hypocholesterolemic agents bringing about an amelioration of certain syndromes, such as those caused by arteriosclerosis. Furthermore, they are useful intermediates in the preparation of other valuable products, especially of pharmacologically active compounds.

Particularly useful are the compounds of Formula II

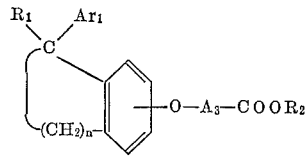

in which $A_3$ stands for alkylene with 1 to 4 carbon atoms, $n$ for the integer from 2 to 4, $R_1$ for hydrogen or methyl, $Ar_1$ for phenyl, (lower alkyl)-phenyl, (lower alkoxy)-phenyl, (halogeno)-phenyl, (trifluoromethyl-phenyl), (di-lower alkylamino)-phenyl, pyridyl, (lower alkyl)-pyridyl, furyl, (lower alkyl)-furyl, thienyl or (lower alkyl)-thienyl and $R_2$ for hydrogen, lower alkyl, di-lower alkylamino-lower alkyl, lower alkyleneimino-lower alkyl or lower alkoxy-lower alkyl in which the hetero atoms are separated by at least 2 carbon atoms, and salts of the compounds having salt-forming groups.

Especially valuable compounds are those of Formula III

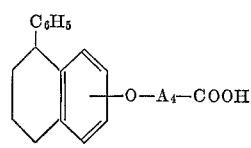

in which $A_4$ stands for methylene or 2,2-propylene and their alkali metal or ammonium salts, which, when given at oral doses between about 0.1 and 50 mg./kg./day, preferably between 1.0 and 25 mg./kg./day, to rats, which are either on a normal or high cholesterol diet, show outstanding hypocholesterolemic activity.

The compounds of this invention are prepared according to methods known per se. For example, they are obtained by:

(a) converting in a compound of the Formula IV

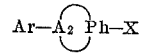

in which X is a substituent capable of being converted into the group —O—$A_1$—Y, in which Y is a free or functionally converted carboxyl group, the substituent X into said group —O—$A_1$—Y, or (b) reacting the ketone of the Formula V

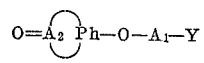

with an Ar-metal compound under dehydrating conditions and, if desired, converting any resulting compound into another compound of the invention.

In the starting material of Formula IV, the substituent X may be converted into the group —O—$A_1$—Y in one step or in stages. A particular suitable substituent X is the hydroxy group. The conversion of the corresponding phenolic intermediate into the desired final product is carried out, for example, by converting the phenol first into a salt, particularly a metal salt, such as an alkali metal, e.g. lithium, sodium or potassium salt, for example, with the use of an alkali metal, its hydroxide, carbonate, hydride, amide, alkoxide or an organic alkali metal compound, e.g. sodium or potassium hydroxide or carbonate, lithium or sodium hydride, sodium or potassium amide, lithium, sodium or potassium methoxide, ethoxide or tert. butoxide, butyl or phenyl lithium. The resulting salt may then be reacted with a reactive ester of the alcohol HO—$A_1$—Y, for example that of a strong mineral acid, particularly a hydrohalic acid, e.g. hydrochloric or hydrobromic acid, a sulfuric or sulfonic acid, such as a lower alkane or benzene sulfonic acid, e.g. methane, ethane or p-toluene sulfonic acid. The formation of the metal salt may also be carried out in situ, i.e. the corresponding phenol and the reactive ester are reacted together in the presence of a metal salt-forming reagent, e.g. potassium carbonate.

The conversion of a free hydroxy group X may also be carried out by reacting the corresponding starting material with the alcohol HO—$A_1$—Y in the presence of a disubstituted carbonate, for example, a diaryl carbonate, e.g. diphenyl carbonate, or especially a di-lower alkyl carbonate, e.g. dimethyl or diethyl carbonate. This reaction is advantageously carried out at an elevated temperature, ranging between about 100° and 210°, preferably between about 180° and 200°, if desired, in the presence of a transesterification catalyst, e.g. sodium or potassium carbonate or a sodium lower alkanolate and preferably in the absence of a diluent.

A further modification of the conversion of a hydroxy group X into the group —O—$A_1$—Y comprises the reaction of said phenol with a corresponding aliphatic aldehyde or ketone in the presence of a tri- or tetrahalogenated methane derivative and a strong base. The former is advantageously chloroform, but also, for example, 1,1,1-trichloroacetone, bromoform, 1,1,1-tribromoacetone, iodoform, chloral, chloral hydrate, bromal bromal hydrate and the latter carbon tetrachloride or tetrabromide. The strong base used is particularly an alkali metal hydroxide e.g. sodium or potassium hydroxide. The reaction is advantageously carried out in the presence of a diluent, which may be furnished by an excess of the aldehyde or ketone reagent.

A further substituent X capable of being converted into the group —O—$A_1$—Y is that of the formula —O—CO—$R_3$, in which $R_3$ stands for esterified or etherified hydroxy, for example, halogeno, particularly chloro or bromo, or lower alkoxy, e.g. methoxy or ethoxy, as well as phenoxy. The corresponding starting material is reacted with the compound HO—$A_1$—Y, advantageously under the conditions previously mentioned for the reaction with the disubstituted carbonates.

The Ar-metal compound mentioned under item (b) may be, for example, a Grignard or alkali metal, e.g. lithium or sodium, compound. The condensation is carried out under the known conditions, during which usually dehydration occurs. The latter preferably takes place under the acidic conditions required for the decomposition of the metal complex and/or elevated temperatures.

In a resulting compound having a free carboxyl group, such group is converted into a functionally converted carboxyl group according to known procedures, for example, by treatment with an alcohol, such as a lower alkanol, in the presence of an esterifying agent, e.g. hydrochloric or sulfuric acid, or with a corresponding diazo compound. The carboxylic acid can also be converted into its halide, e.g. chloride, and the latter is reacted with an alkali metal, e.g. sodium or potassium alcoholate, such as a lower alkoxide, ammonia, a primary or secondary amine, in order to yield esters or amides respectively. The carboxylic acid may further be reacted with a reactive ester of an alcohol, such as an aliphatic halide, e.g. a lower alkyl halide or tert. amino-lower alkyl halide, in the presence of a base, e.g. potassium carbonate. An ammonium salt of said acids can be dehydrated, for example, by treatment with phosphorus pentoxide or oxychloride, in order to yield the amide, which may be further dehydrated to yield the corresponding nitrile. In resulting compounds containing a functionally converted carboxyl group, this group can be converted into a free or another converted carboxyl group by known methods. For example, resulting esters can be hydrolyzed, advantageously by treatment with a base, e.g. sodium or potassium hydroxide. A nitrile or amide can be converted into the free acid by hydrolysis with either a strong base or acid, e.g. sulfuric acid. Furthermore, a resulting ester can be transesterified for example, by treatment with an alcohol, e.g. a lower alkanol, in the presence of a metal alcoholate, e.g. sodium, potassium or aluminium lower alkoxide, an alkali metal cyanide, or benzyl trimethyl ammonium hydroxide. A resulting ester can also be converted into an amide, for example, by treatment with ammonia, a primary or a secondary amine, if necessary, under increased pressure. A resulting nitrile can also be converted into a corresponding ester, for example, by treatment with an alcohol, e.g. a lower alkanol, in the presence of a suitable mineral acid, e.g. sulfuric or hydrochloric acid. Any resulting compound in which $A_1$ and/or $A_2$ is alkenylene can be converted into the corresponding saturated compound, for example, by treatment with catalytically activated or nascent hydrogen, such as hydrogen in the presence of a nickel, palladium or platinum catalyst; or hydrogen generated during electrolysis or the action of metals on acids or alcohols.

A resulting acid can be converted into its salts according to conventional methods, for example, by reacting it with an about stoichiometric amount of a suitable salt-forming reagent, such as ammonia, an amine or an alkali metal hydroxide, carbonate or hydrogen carbonate. A salt of this type can be reconverted into the free acid by treatment with an acid, e.g. hydrochloric, sulfuric or acetic acid. A resulting compound containing a basic group, such as an amino group, can be converted into a corresponding acid addition salt, for example by reacting it with an acid, such as a therapeutically useful acid or with a corresponding anion exchange preparation, and isolating the desired salt. The latter may be converted into the free compound by treatment with a base, e.g. a metal hydroxide, ammonia or a hydroxyl ion exchange preparation.

Resulting mixtures of isomers can be separated into the single isomers according to known methods. For example, geometrical or optical isomers may be separated into the single isomers by exploiting physicochemical differences, such as differences in solubility or different boiling points between such compounds. Racemates are resolved into the antipodes according to conventional resolution procedures.

The above reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The starting material used is known or, if new, may be prepared according to methods known per se. For example, that of Formula IV can be prepared analogous to the method shown under item (b) or by reaction of compounds of the formulae

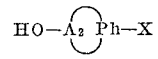

and Ar-H, wherein Ar advantageously is substituted, in the presence of an acidic catalyst, such as sulfuric or phosphoric acid or aluminum chloride. Instead of the free phenols, also suitable phenol ethers may be chosen, which can be hydrolyzed after the above-mentioned condensations, for example, with pyridine hydrochloride. The compounds of Formula V can be prepared analogous to the method shown under item (a).

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to final products indicated above as being the preferred embodiments of the invention.

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade and all parts wherever given are parts by weight.

Example 1

To the stirred mixture of 6.7 g. 1-phenyl-5-hydroxy-1,2,3,4-tetrahydro-naphthalene, 3.0 g. sodium hydroxide and 100 ml. acetone, the solution of 4.3 g. chloroacetic acid in 50 ml. acetone is added during 10 minutes. The mixture is then refluxed for 2½ hours, cooled to room temperature and filtered. The residue is dried, dissolved in 100 ml. water and the solution acidified with concentrated hydrochloric acid. The precipitate formed is filtered off and the filtrate extracted with ethyl acetate. The extract is dried, filtered, evaporated and the residue combined with the previously obtained filter cake. The whole is triturated with 300 ml. methanol and the suspension filtered to yield the (1-phenyl-1,2,3,4-tetrahydro-5-naphthoxy)-acetic acid of the formula

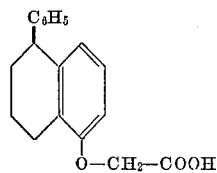

melting at 204–205°.

Example 2

To the stirred mixture of 6.7 g. 1-phenyl-6-hydroxy-1,2,3,4-tetrahydro-naphthalene, 3.0 g. sodium hydroxide and 100 ml. acetone, the solution of 4.3 g. chloroacetic acid in 50 ml. acetone is added during 10 minutes. The mixture is then refluxed for 2½ hours, cooled to room temperature, diluted with 50 ml. acetone and filtered. The residue is dried, dissolved in 100 ml. water and the solution acidified with concentrated hydrochloric acid. The mixture is extracted with diethyl ether, the extract washed with water, dried, evaporated and the residue recrystallized from 95% aqueous ethanol to yield the (1-phenyl-1,2,3,4-tetrahydro-6-naphthoxy)-acetic acid of the formula

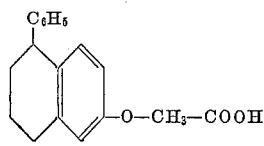

melting at 148–149°.

Example 3

To the mixture of 7.4 g. 1-phenyl-5-hydroxy-1,2,3,4-tetrahydro-naphthalene, 100 ml. acetone and 8.5 g. sodium hydroxide, 3.36 ml. chloroform are added dropwise while stirring and refluxing. The mixture is refluxed for 2 hours during which time 100 ml. acetone are added to facilitate stirring. It is cooled to room temperature, filtered and the residue washed with acetone. The filtrate is evaporated in vacuo, the residue taken up in 100 ml. water and the mixture extracted with diethyl ether. The aqueous solution is acidified with hydrochloric acid, extracted with diethyl ether, the extract washed with water, dried, filtered and evaporated. The residue is taken up in hexane, the solution treated with charcoal, filtered and the filtrate allowed to crystallize to yield the 2-(1-phenyl-1,2,3,4-tetrahydro-5-naphthoxy)-isobutyric acid of the formula

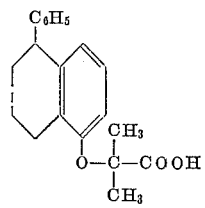

melting at 128–130°.

Example 4

To the mixture of 9.0 g. 1-phenyl-6-hydroxy-1,2,3,4-tetrahydro-naphthalene, 9.6 g. sodium hydroxide and 100 ml. acetone, 3.84 ml. chloroform are added dropwise while stirring and refluxing. The mixture is refluxed for 3 hours during which time 200 ml. acetone are added portionwise in order to facilitate stirring. It is cooled to room temperature, filtered and the residue washed with acetone and dried. It is taken up in water, the solution acidified with concentrated hydrochloric acid and extracted with diethyl ether. The extract is washed with water, dried, filtered and evaporated. The residue is taken up in hexane, the solution treated with charcoal, filtered, evaporated, and the residue recrystallized from pentane-hexane and aqueous ethanol to yield the 2-(1-phenyl-1,2,3,4-tetrahydro-6-naphthoxy)-isobutyric acid of the formula

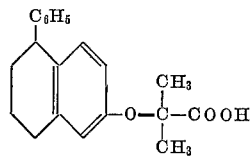

melting at 91–92°.

The starting material is prepared as follows: To the stirred suspension of 6.08 g. magnesium turnings in 50 ml. diethyl ether, the solution of 39.26 g. bromo-benzene in 100 ml. diethyl ether is added at such rate that the ice-cooled mixture is maintained at reflux. Hereupon it is refluxed until the whole magnesium is consumed. The mixture is cooled in an ice bath and the solution of 35.2 g. 6-methoxy-1-tetralone in 100 ml. diethyl ether and 50 ml. benzene are added during 20 minutes. The mixture is then stirred at room temperature for ½ an hour, refluxed for 2½ hours and allowed to stand over the weekend at room temperature. To the mixture 75 ml. 2 N-hydrochloric acid are added while cooling and stirring followed by 50 ml. water. The organic layer is separated, the aqueous solution extracted with diethyl ether, the extract combined with the organic layer, washed with water, dried and evaporated. The residue is recrystallized from pentane-hexane to yield the 1-hydroxy-1-phenyl-6-methoxy-1,2,3,4-tetrahydro-naphthalene melting at 67–70°.

45.8 g. thereof are dissolved in 350 ml. 95% aqueous ethanol containing 4.5 ml. concentrated hydrochloric acid. The mixture is refluxed for 5 minutes and allowed to stand in the refrigerator overnight. The precipitate formed is filtered off, the residue washed with aqueous ethanol and dried to yield the 1-phenyl-6-methoxy-3,4-dihydro-naphthalene melting at 70–71°.

The mixture of 14.0 g. thereof, 100 ml. glacial acetic acid and 1 g. 10% palladium-charcoal is hydrogenated at room temperature until 1,845 ml. hydrogen are consumed. It is filtered, the filtrate evaporated in vacuo, the residue taken up in hexane, the solution washed with water and aqueous sodium carbonate, dried, filtered and evaporated. The residue is distilled and the fraction boiling at 130–135°/0.1 mm. Hg collected; it represents the 1-phenyl-6-methoxy-1,2,3,4 - tetrahydro-naphthalene melting at 41–42°.

19.4 g. thereof are added to the melt, prepared from 200 ml. pyridine and 246 ml. concentrated hydrochloric acid, at about 200°. The mixture is refluxed for ½ an hour at about 250° and poured into 600 ml. cold water. The mixture is filtered, the residue taken up in diethyl ether, the solution washed with water, dried and evaporated. The residue is recrystallized from hexane-benzene and dried at 50° in vacuo to yield the 1-phenyl-6-hydroxy-1,2,3,4-tetrahydro-naphthalene melting at 113–114°.

The 1 - phenyl - 5 - hydroxy-1,2,3,4-tetrahydro-naphthalene, melting at 72–73°, is analogously prepared from equivalent amounts of the corresponding intermediates.

Example 5

To the Grignard reagent, prepared from 2.5 g. magnesium turnings and 16 g. bromo-benzene in 100 ml. diethyl ether, cooled to about —25°, the solution of 29.2 g. ethyl 2 - (1 - oxo-1,2,3,4-tetrahydro-6-naphthoxy)-isobutyrate in 100 ml. tetrahydrofuran are added dropwise while stirring. The mixture is allowed to warm up to room temperature and is stirred for 3 more hours. The complex formed is decomposed by the addition of saturated aqueous ammonium chloride, the organic layer separated, dried and evaporated under reduced pressure. The residue is taken up in diethyl ether, the solution acidified with one drop of concentrated hydrochloric acid, refluxed for 5 minutes, dried and evaporated. The residue is distilled and the fraction boiling at 160–180°/0.2 mm. Hg collected; it represents the ethyl 2(1-phenyl-3,4-dihydro-6-napthoxy)-isobutyrate of the formula

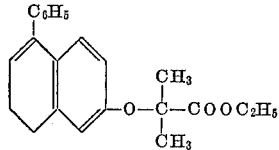

The starting material is prepared as follows: To the solution of 16.2 g. 6-hydroxy-1-tetralone in 300 ml. xylene, 2.3 g. sodium are added while heating and stirring. After the sodium is consumed, the mixture of 19.5 g. ethyl 2-bromo-isobutyrate in 50 ml. xylene are added portionwise and the mixture is refluxed for 6 hours. It is filtered, the filtrate evaporated in vacuo, the residue distilled and the fraction boiling at 100–120°/0.2 mm. Hg collected; it represents the ethyl 2-(1-oxo-1,2,3,4-tetrahydro-6-naphthoxy)-isobutyrate.

Example 6

30 g. ethyl 2-(1-phenyl-3,4-dihydro-6-naphthoxy)-isobutyrate are hydrogenated in 100 ml. ethanol over 2.0 g.10% palladium-charcoal until the theoretical amount of hydrogen is absorbed. The mixture is then filtered and the filtrate combined with the solution of 30 g. potassium hydroxide in 300 ml. methanol. The solution is refluxed for 2 hours and evaporated under reduced pressure. The residue is dissolved in 200 ml. water, the solution extracted with diethyl ether, the aqueous layer separaed and acidified with concentrated hydrochloric acid. It is extracted with diethyl ether, the extract washed with water and brine, dried, filtered and evaporated. The residue is recrystallized from 95% aqueous ethanol to yield the 2-(1-phenyl-1,2,3,4-tetrahydro-6-naphthoxy)-isobutric acid melting at 89–91°; it is identical with the product obtained according to Example 4.

I claim:
1. A pharmaceutical composition comprising essentially a hypocholesterolemically effective amount of a compound having the formula

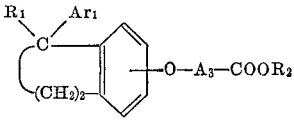

in which $A_3$ is alkylene with 1 to 4 carbon atoms, $R_1$ is hydrogen, $Ar_1$ is phenyl, and $R_2$ is hydrogen or lower alkyl, or an ammonium or alkali metal salt of the acid, together with 50–99% of an enterally or parenterally applicable pharmaceutical excipient.

2. A composition as claimed in claim 1, wherein the hypocholesterolemic compound is that of the formula

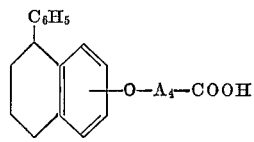

in which $A_4$ is methylene or 2,2-propylene, or the alkali metal or ammonium salt thereof.

References Cited

UNITED STATES PATENTS

| | | | |
|---|---|---|---|
| 2,954,400 | 9/1960 | Shapiro et al. | 42—317 X |
| 3,262,850 | 7/1966 | Jones, et al. | 424—317 |
| 3,347,910 | 10/1967 | Bolhofer et al. | 260—520 |

ALBERT T. MEYERS, Primary Examiner

N. A. DREZIN, Assistant Examiner

U.S. Cl. X.R.

424—308; 260—473, 520